(No Model.)
J. W. WILSON.
FEED REGULATOR FOR ROLLER MILLS.
No. 400,986.
2 Sheets—Sheet 1.
Patented Apr. 9, 1889.
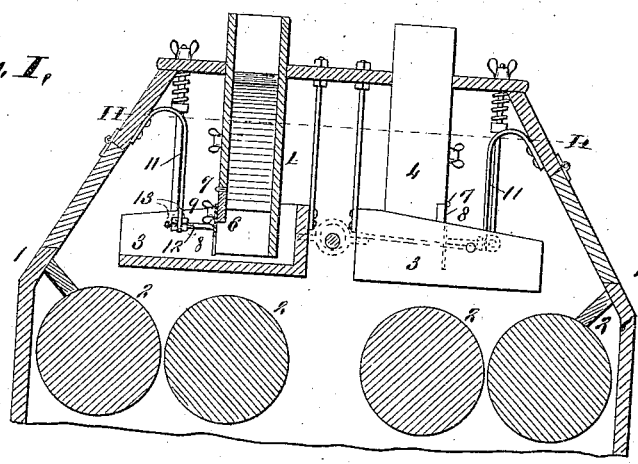
Fig. I.
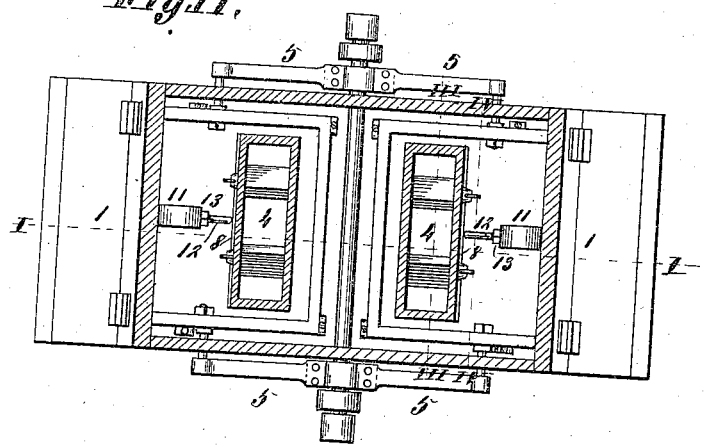
Fig. II.
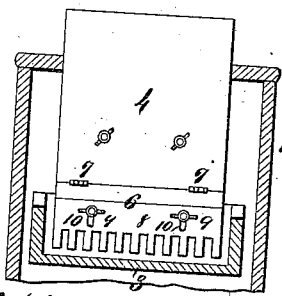
Fig. IV.
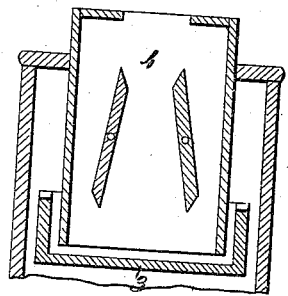
Fig. III.
Attest:
Emma Arthur.
Edward Stew.
Inventor:
Joseph W. Wilson
By Knight Bros.
Atty's

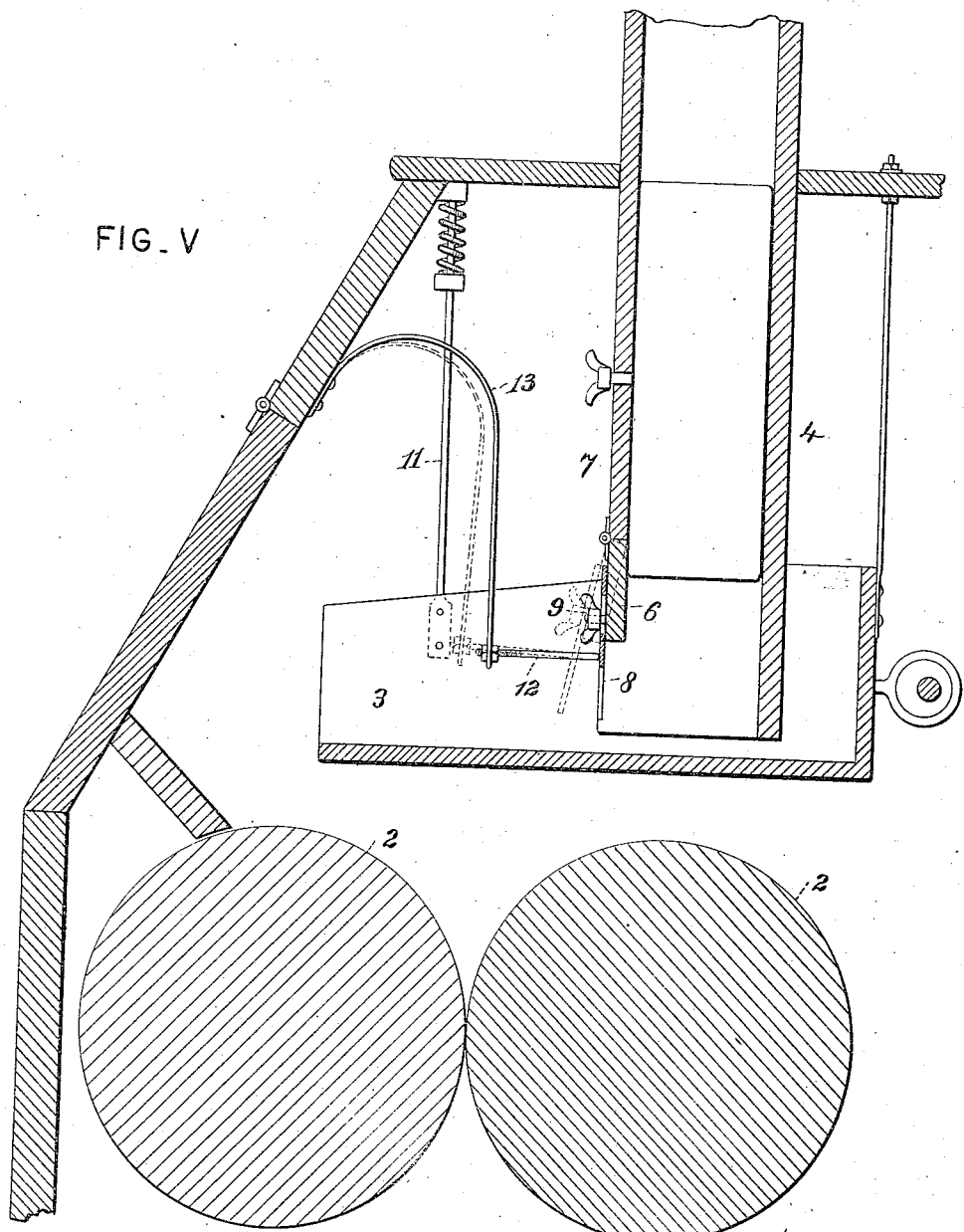

UNITED STATES PATENT OFFICE.

JOSEPH W. WILSON, OF BROOKVILLE, KANSAS.

FEED-REGULATOR FOR ROLLER-MILLS.

SPECIFICATION forming part of Letters Patent No. 400,986, dated April 9, 1889.

Application filed March 16, 1888. Serial No. 267,390. (No model.)

*To all whom it may concern:*

Be it known that I, JOSEPH W. WILSON, of Brookville, in the county of Saline and State of Kansas, have invented certain a new and useful Improvement in Feed-Regulators for Roller-Mills, of which the following is a full, clear, and exact description, reference being had to the accompanying drawings, forming part of this specification, and in which—

Figure I is a detail vertical section through the upper portion of a mill, showing my improvement. This section is taken on line II, Fig. II. Fig. II is a horizontal section taken on line II II, Fig. I. Fig. III is a vertical section taken on line III III, Fig. II. Fig. IV is a similar view taken on line IV IV, Fig. II. Fig. V is an enlarged sectional detail view illustrating my invention.

My present invention relates to an improvement in the feed mechanism of a roller-mill.

My invention consists in features of novelty, hereinafter fully described, and pointed out in the claims.

Referring to the drawings, 1 represents the casing or housing of the mill; 2, the rolls; 3, shoes; 4, feed spout or hopper, and 5 a mechanism for vibrating the shoes. I make no claim here as inventor to any of these parts *per se*, and have shown them constructed and arranged the same as in my application filed October 22, 1886, Serial No. 216,961.

I will confine this description to the parts to which my present invention relates, and will describe the parts on one side of the machine only, as the other side is a duplicate and either side works independently of the other.

6 represents a strip hinged at 7 to the hopper or spout 4. To the lower edge of this strip a rake or comb, 8, is secured, preferably by means of set-screws 9, passing through slots 10 in the rake, to provide means for a vertical adjustment of the rake when desired.

11 represents a light spring of any suitable material, which is attached to the housing at its upper end. Through the lower end of this spring a rod, 12, is passed. The rod is held on the spring by nuts 13, one on each side of the spring. The object of this spring is to make the feeder strictly automatic in operation, as well as distributive, as heretofore. One end of the rod 12 bears against the rake, and the amount of pressure desired against the rake is regulated by the nuts 13, which may be turned in or out on the rod. The teeth of the rake are made with parallel sides, as shown in Fig. IV—that is to say, the spaces between the teeth are equal in width from top to bottom. A rake somewhat similar to this, except that the teeth are V or saw-tooth shape, is shown in my application referred to. The disadvantage of the saw-tooth shape is that when the stock being treated begins to increase in volume from any cause, and begins to rise on the shoe up the rake, it is obvious that the increased volume of stock will not be met by increased capacity of the rake; but the result will be just opposite, owing to the angular shape of the openings between the teeth, which grow smaller as they advance upward. Thus the hopper will fill up and choke back on other parts of the mill, causing great inconvenience and waste. With my present arrangement I overcome all these difficulties: first, by making the openings between the teeth one size all the way up; second, when the stock being treated shall from any cause fill up above the teeth of the rake, the spring 20 will yield and let the extra amount of stock pass through, when it will again bring the rake back to its normal or proper position.

I am aware that agitators with straight narrow teeth have been used in connection with valve-boards and rollers at the mouth of the hopper; but these are not the equivalents of my broad straight teeth used alone in connection with a shoe, as specified.

The object of my invention is to oppose the passage of the grain in a bulk and allow it to flow evenly and slowly, while, if the grain becomes crowded in the spout, not to keep it back sufficiently to choke the machine. This form of rake has not been before used in this connection, and the above functions are not performed in the devices where straight teeth and a roller are used.

Letters Patent have been granted to me for a similar device to that herein described, excepting that the teeth were not straight; but in this form of device I have found a serious drawback, owing to the fact that as the grain piles up it is restricted more.

I claim as my invention—

1. In a feed-regulator, a vibrating shoe, in combination with a rake having teeth with parallel sides, forming spaces of equal width from top to bottom of the teeth, substantially as and for the purpose set forth.

2. In a feed-regulator the combination of the vibrating shoe, a hinged rake having teeth with parallel sides forming spaces of uniform width, and a spring acting on the rake, substantially as and for the purpose set forth.

3. In a feed-regulator, the combination of the vibrating shoe, a hinged rake having teeth with parallel sides, a spring, and a pin on the spring bearing against the rake, substantially as and for the purpose set forth.

4. In a feed-regulator, the combination of the vibrating shoe, a hinged rake, a spring, and an adjustable pin passing through the spring and bearing against the rake, substantially as and for the purpose set forth.

5. In a feed-regulator, the combination of the vibrating shoe, a hopper, a rake hinged to the hopper by a strip, 6, and adjustable on said strip, a spring, and a pin made adjustable by nuts 13, by which it is secured to said spring, substantially as and for the purpose set forth.

JOSEPH W. WILSON.

In presence of—
  F. COBB,
  A. WYLIE.